L. B. TALBOTT.
STEAM BAKER.
APPLICATION FILED SEPT. 14, 1920.
1,406,777.
Patented Feb. 14, 1922.
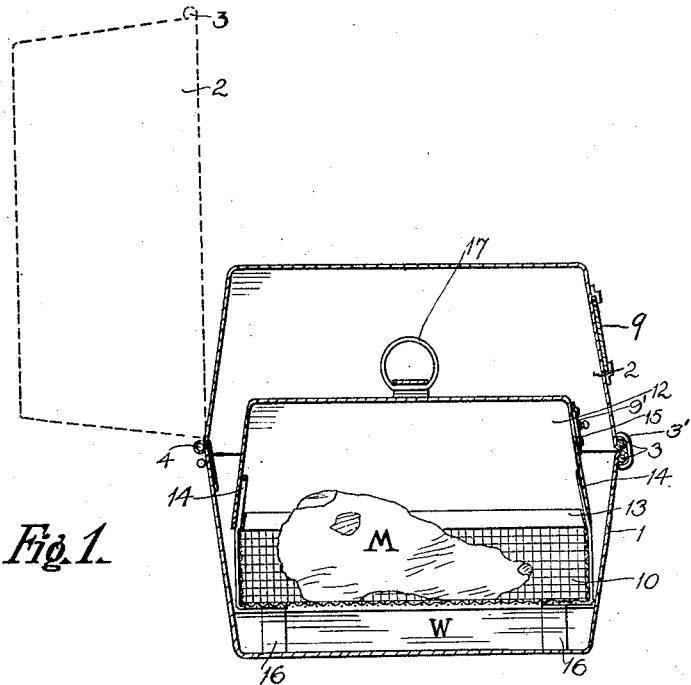
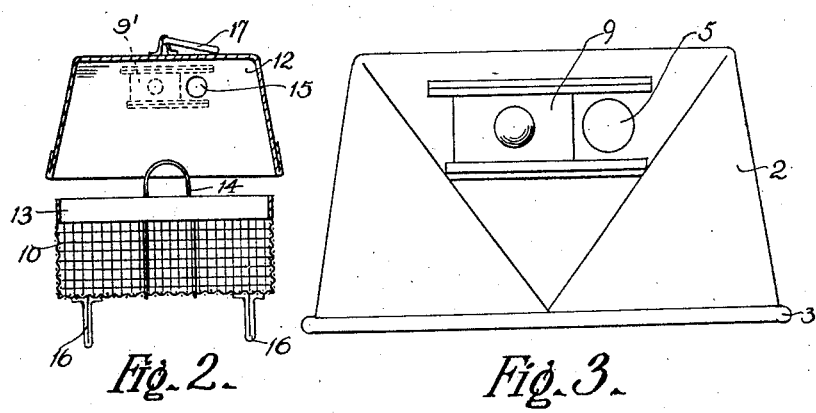
Inventor
Louise B. Talbott.
Attorney

UNITED STATES PATENT OFFICE.

LOUISE B. TALBOTT, OF AUGUSTA, GEORGIA.

STEAM BAKER.

1,406,777.

Specification of Letters Patent.   Patented Feb. 14, 1922.

Application filed September 14, 1920. Serial No. 410,117.

*To all whom it may concern:*

Be it known that I, LOUISE B. TALBOTT, a citizen of the United States, residing at Augusta, in the county of Richmond, State of Georgia, have invented certain new and useful Improvements in Steam Bakers; and I do hereby declare the following to be a full, clear, and exact description of the invention, such as will enable others skilled in the art to which it appertains to make and use the same.

This invention relates to steam bakers and it has for its object to provide a construction in which the meat to be baked is confined within a comparatively small compartment, the top and upper side portions of which are of sheet metal and of limited area so that they will be in close relation to the meat so that the meat juices will be collected and will quickly accummulate in sufficient quantity to permit them to drip.

A further object of the invention is to provide a baker in which this inner compartment will be enclosed in a much larger outer compartment providing a steam jacket around the inner compartment that will maintain a comparatively even temperature of the inner compartment and the meat therein and will at the same time prevent the heating of the inner compartment to a degree to burn the meat. With this arrangement, the upper portion of the inner compartment or the inner cover may even rest upon the meat, without injury to it during the cooking operation. With this arrangement, burning of the juices on the drip cover is prevented.

Figure 1 is a longitudinal section through this baker with all parts assembled, illustrating a piece of meat in the basket and the initial depth of water in the pan, and showing the cover of the latter in dotted lines as raised.

Figure 2 is a cross section through the basket and its cover, with the latter slightly elevated.

Figure 3 is a detail at one end of the jacket cover, showing a damper or closure for the steam outlet opening therein.

The casing or jacket comprises a lower member or pan 1 and an upper member or cover which is an inverted pan 2, preferably a duplicate of the first pan as shown. Both pans have beads 3 around their open mouths, and the beads are connected at one end by hinges 4. In the upper pan or cover and preferably in that end remote from the hinge is a steam outlet hole 5.

The inner element is made up of a basket and its cover. The basket 10 should be entirely of wire mesh and somewhat smaller than the pan 1 so that it may be passed into the same. By preference it has a beaded edge 13 and handles 14 at its ends, and it has four depending legs 16 which are between one and two inches long and are intended to hold the bottom of the basket above the level of the water indicated at W in Figure 1. The cover 12 for the basket should be of sheet metal, should conform in contour with but be smaller than the cover member 2, should be of a size at its mouth to pass over the mouth of the basket and its handles, and should itself have a handle as shown at 17. In one end of this cover is an outlet opening or hole 15.

In the use of this baker, a piece of meat as indicated at M is placed within the basket, water W is placed in the pan 1 up to about the level indicated, the basket is then put into this pan and its legs hold the meat well above the water level, the cover 12 is then put onto the basket, and the jacket is then closed by turning its cover 2 on its hinges down onto the pan 1 as seen in Figure 1. The whole structure is now put into the oven, where it may remain for a proper length of time without attention on the part of the cook. As the water becomes heated it generates steam, and this steam rising against and passing around the meat cooks the same. Whatever steam strikes the top of the inner cover and condenses thereon falls back onto the meat so that the latter is basted automatically. Excess steam passes off through the openings 15 and 5. As seen in Figure 3 the outer opening 5 may have a damper or closure 9, and when this is closed the steam passing out the inner opening 15 is retained within the jacket, and if it condenses, the water of condensation will run back into the water W within the pan. However, it is not necessary to close the opening 5, and this may be left to the discretion of the cook. So long as the heat in the oven is not excessive and the water is not permitted to entirely boil out, the meat will not burn. While I have spoken herein of "meat" it will be understood that I include anything that may be cooked in this device. The opening 15 may also have a damper 9' as shown in Figure 1 and as indicated in dotted lines in Figure 2.

Also, it will be understood that the member 2 is held closed by any suitable style of catch, such as the hook 3' and that suitable handles may be provided of whatever type and secured in whatever manner is desired.

What is claimed is:

A steam food baker comprising an outer compartment having a cover, the compartment being adapted to hold water in its lower portion and to confine steam rising from the water, and an inner compartment disposed within the outer compartment and supported above the bottom thereof, the inner compartment having its lower portion foraminous and including also a sheet metal cover constituting the top and the upper portions of the sides and ends thereof to collect juices that rise from the food and return them thereto, the inner compartment being spaced from the outer compartment to form with said outer compartment a steam chamber enclosing the inner compartment.

In testimony whereof, I affix my signature, in the presence of two witnesses.

LOUISE B. TALBOTT.

Witnesses:
H. HOLT HILL,
O. M. BURCH.